(12) United States Patent
Ding

(10) Patent No.: US 8,641,197 B2
(45) Date of Patent: Feb. 4, 2014

(54) ACOUSTICAL RECEIVER AND PEN TRANSCRIPTION SYSTEM ADAPTED FOR REJECTING VIRTUAL PEN IMAGES

(75) Inventor: Yao Ding, San Jose, CA (US)

(73) Assignee: Luidia Inc., San Carlos, CA (US)

( * ) Notice: Subject to any disclaimer, the term of this patent is extended or adjusted under 35 U.S.C. 154(b) by 226 days.

(21) Appl. No.: 13/336,553

(22) Filed: Dec. 23, 2011

(65) Prior Publication Data

US 2013/0162953 A1 Jun. 27, 2013

(51) Int. Cl.
| | | |
|---|---|---|
| G03B 21/00 | (2006.01) | |
| G03B 31/00 | (2006.01) | |
| G01S 3/80 | (2006.01) | |
| G01S 5/18 | (2006.01) | |
| G08B 3/02 | (2006.01) | |
| G06F 3/033 | (2013.01) | |
| G06F 3/041 | (2006.01) | |
| G06F 3/043 | (2006.01) | |
| G06K 11/06 | (2006.01) | |
| G08C 21/00 | (2006.01) | |
| H04B 1/06 | (2006.01) | |
| H05K 5/00 | (2006.01) | |

(52) U.S. Cl.
USPC .............. 353/42; 353/15; 353/122; 367/128; 367/135; 181/125; 181/139; 181/152; 345/177; 345/179; 178/18.04; 178/19.02; 178/19.07

(58) Field of Classification Search
USPC ....................... 353/15, 42, 122; 367/135, 118, 367/124–128; 181/139, 148, 152, 157–159, 181/123, 125, 143; 345/177, 179–183; 434/408; 178/18.01–18.04, 18.09, 178/19.01–19.02, 19.07
See application file for complete search history.

(56) References Cited

U.S. PATENT DOCUMENTS

| | | | | |
|---|---|---|---|---|
| 4,814,552 | A * | 3/1989 | Stefik et al. ................. | 178/19.02 |
| 6,335,723 | B1 * | 1/2002 | Wood et al. .................. | 345/173 |
| 6,414,673 | B1 * | 7/2002 | Wood et al. .................. | 345/173 |
| 6,654,008 | B2 * | 11/2003 | Ikeda et al. .................. | 345/179 |
| 6,919,881 | B2 * | 7/2005 | Chou ............................ | 345/173 |
| 8,085,249 | B2 * | 12/2011 | Holtzman et al. ............ | 345/173 |
| 8,223,136 | B2 * | 7/2012 | Hu et al. ....................... | 345/179 |
| 8,324,517 | B2 * | 12/2012 | Conrad ........................ | 178/18.04 |
| 2009/0213070 | A1 * | 8/2009 | Kalaldeh et al. ............. | 345/157 |
| 2011/0284296 | A1 * | 11/2011 | Harel et al. ................. | 178/19.02 |

* cited by examiner

Primary Examiner — Tony Ko
Assistant Examiner — Jori S Reilly-Diakun
(74) Attorney, Agent, or Firm — Dov Rosenfeld; Inventek

(57) ABSTRACT

An acoustical receiver for detecting an acoustical signal characterized by a wavelength and a pen transcription system utilizing the same are disclosed. The receiver includes a detector that generates an electrical signal in response to acoustical signals in a predetermined frequency range including that wavelength, a housing surrounding the detector, and a receiving horn. The housing has a housing aperture having a maximum dimension less than the acoustical signal wavelength. The receiving horn has a first opening that is adjacent to the housing aperture and a second aperture having a dimension that is greater than the acoustical signal wavelength.

16 Claims, 7 Drawing Sheets

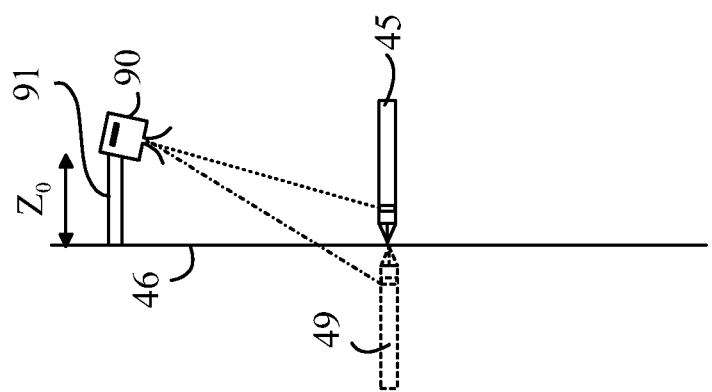

ACOUSTICAL RECEIVER AND PEN TRANSCRIPTION SYSTEM ADAPTED FOR REJECTING VIRTUAL PEN IMAGES

BACKGROUND

Interactive computer displays on which a user draws with a writing implement that simulates a marking pen and/or a pointing device are particularly attractive for use in classrooms as replacements for white boards. Such systems typically include a display that provides an image on a large format computer display or a projected image on a vertical surface and a "pen" which the user uses to "write" on the display. The projected image typically includes material that the user wishes to discuss and highlight during the user's lecture. The pen has a tracking mechanism that allows the system to monitor the pen position and the status of one or more buttons on the pen. When the user "writes" on the display with the pen, the system tracks the position of the pen and updates the display to show a line at the locations traversed by the pen. The pen can also be used as a pointing device for activating various controls that are represented by "buttons" on the displayed image. The user activates the controls by pressing the pen to the button object on the displayed image. The user signals the system as to the mode of use by pressing one or more buttons on the pen.

One class of pen tracking systems utilizes a pen that emits ultrasound pulses together with infrared synchronizing pulses. The pulses are received by two or more sensors that are mounted on the display surface. The sensors are spaced apart from one another by a known distance. By measuring the difference in time of arrival between the infrared pulses and the ultrasound pulses the position of the pen relative to the sensors can be determined. This type of system has the advantage of tracking the pen even when the user is between the projector and the display surface.

The pen generates a modulated sine wave at an ultrasound frequency. The receivers and associated electronics must detect the beginning of the modulation envelope to determine the time of arrival at each receiver. The precision of the system depends on the assumption that the pen generates a particular modulated envelope that is constant in shape independent of the location of the pen on the writing surface.

The acoustical transmitter on the pen is typically mounted above the end of the pen so that the pulses originate from a location that is above the writing surface. Since the writing surface is typically a good sound reflector, a virtual image of the transmitter is generated in which the virtual transmitter appears to be on the other side of the writing surface. When the acoustical receivers are mounted on the writing surface, the arrival times of the signals from the real pen and the virtual pen are essentially the same, and there is no significant interference between the two signals.

However, there are important applications in which the receivers must be mounted above the writing surface; for example, interactive displays in which the receivers are incorporated in a projector mount requiring that the receiver be mounted above the writing surface. When the acoustical receivers are mounted above the writing surface with an offset more than a quarter of the wavelength, difference in arrival times between the real pen and virtual pen signals can be as high as half of the wavelength. In that case, interference between the wave forms can be significant and the distortions can cause the detection algorithm to fail. The worst case occurs when the distance between the real pen and virtual pen is an odd multiple of half wavelength.

SUMMARY

The present invention includes an acoustical receiver for detecting an acoustical signal characterized by a wavelength. The receiver includes a detector that generates an electrical signal in response to acoustical signals in a predetermined frequency range including that wavelength, a housing surrounding the detector, and a receiving horn. The receiving horn has a first opening that is adjacent to the acoustical sensor, and a second opening that receives said acoustical signal. The depth of the horn and shape of the horn are chosen such that the horn has a cut-off frequency that is less than half of the frequency of the acoustical signal.

BRIEF DESCRIPTION OF THE DRAWINGS

FIG. 8 illustrates the orientation of one of the acoustical receivers relative to the pen.

DESCRIPTION OF EMBODIMENTS OF THE INVENTION

Figure 1:
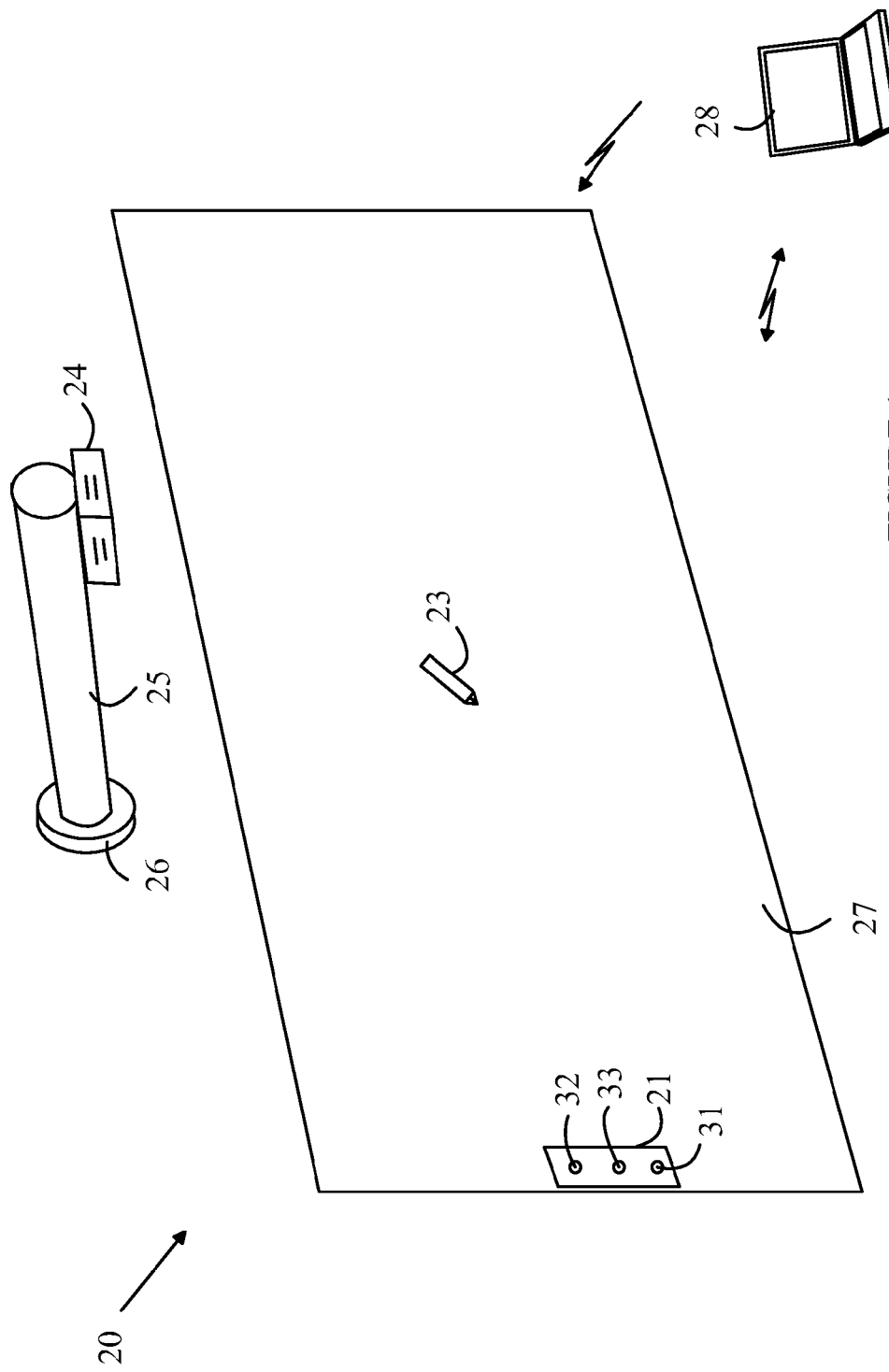
FIG. 1 is a prospective view of a prior art interactive display.

The manner in which the present invention provides its advantages can be more easily understood with reference to FIG. 1, which is a prospective view of a prior art interactive display. Interactive display 20 utilizes a projector 24, which is in communication with a computer 28 to generate an image on a display surface 27 utilizing an appropriate software package. The projector is mounted on a wall via a base unit 26 that supports an extension arm 25. The various electrical connections have been omitted from the drawing to simplify the drawing. In the embodiment shown in FIG. 1, computer 28 communicates with projector 24 via a wireless link. Interactive display 20 also includes a "pen" 23 whose position is determined by a tracking sub-system 21 that also communicates with computer 28 via a controller that is included in tracking sub-system 21. When the user activates a switch associated with pen 23, the pen position is periodically determined and the results sent to computer 28. The software package updates the image display by adding a line that connects the locus points determined by tracking sub-system 21.

Tracking sub-system 21 includes two acoustical receivers 31 and 32 that are spaced apart from one another and an infrared receiver 33. Pen 23 includes an acoustical transmitter and an infrared transmitter. The acoustical transmitter transmits an ultrasound pulse periodically. The infrared transmitter transmits an optical pulse that is synchronized to the ultrasound pulse. The difference in time of arrival between the optical pulse and ultrasound pulse at each acoustical receiver is used to compute the distance between the pen and that receiver. Two such distances define the location of the pen 23 on display surface 27. The location information can be sent to computer 28 via a wireless link, and hence, tracking sub-system 21 only requires power.

The present invention is based on the observation that it would be advantageous to incorporate tracking sub-system 21 in base unit 26, extension arm 25, or projector 24 itself. Since the base and arm already have power, the tracking sub-system can be powered from the same source. If the projector utilizes a serial communication link, the serial communication from sub-system 21 could be incorporated in that link or remain a wireless communication. Unfortunately, incorporating the tracking sub-system into base 26, extension arm 25, or projector 24 presents the challenges discussed above, since the sub-system would no longer be mounted on the display surface.

Figure 2:
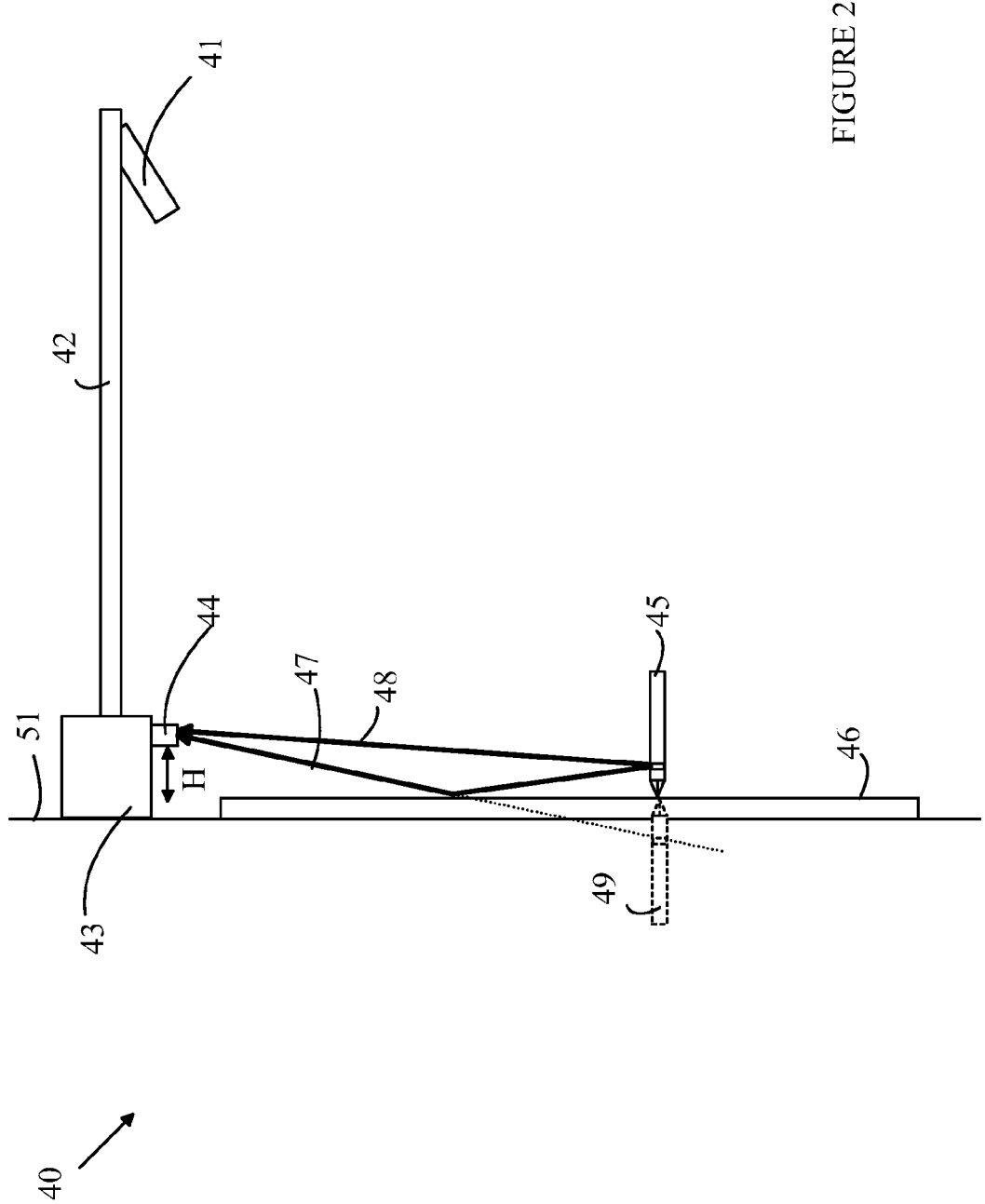
FIG. 2 is a cross-sectional view of an interactive display system according to one embodiment of the present invention.

Refer now to FIG. 2, which is a cross-sectional view of an interactive display system according to one embodiment of the present invention. Display system 40 includes a projector 41 that projects an image onto a display surface 46. Projector 41 is mounted above the user on an arm 42 that is attached to a vertical wall 51 by a base unit 43. The length of arm 42 is set to minimize problems associated with the user casting a shadow on the display surface. To support the weight of projector 41 mounted on arm 42, a base unit 43 is typically attached to the wall. The power and any signal cables are run through the base unit to projector 41 through arm 42.

To simplify the following discussion, it will be assumed that the sensors are mounted in base unit 43. However, embodiments in which the sensors are mounted in arm 42 or projector 41 could also be constructed.

Display system 40 includes an ultrasound receiver 44 that detects the distance from "pen" 45 to ultrasound receiver 44. Ultrasound receiver 44 is typically positioned some distance, H, above the projection surface. In display system 40, H is set by the structural requirements of base unit 43. In addition, it is advantageous to position ultrasound receiver 44 to accommodate a variety of different spacings of display surface 46 with respect to vertical wall 51. The displacement of ultrasound receiver 44 and the transmitter on the pen from the surface of display surface 46 results in a multi-path problem, since the projection surface is typically a good ultrasound reflector. Hence, the pen generates a direct signal that travels on path 48 and a reflected signal that travels on path 47. In essence, ultrasound receiver 44 "sees" two pens, pen 45 and a virtual pen 49 on the other side of the projection surface. This virtual source interferes with the accurate measurement of the distance from pen 45 to each of the acoustical receivers in ultrasound receiver 44.

The present invention is based on the observation that the signal from the virtual pen arrives after that from the real pen, and hence, the interference is primarily a variable distortion in the signal envelope that occurs after the leading edge of the envelope arrives at the receivers. Accordingly, if the virtual image is averaged over time, the coherence can be reduced, and hence, the problems associated with the distortion of the envelope of the desired signal are significantly reduced.

Figure 3:
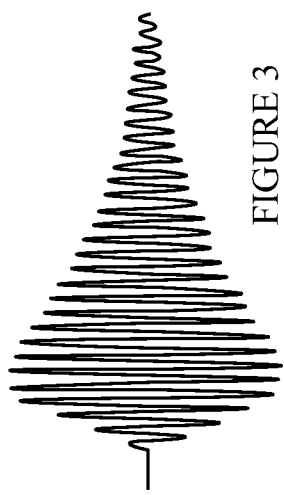
FIG. 3 illustrates the waveform that is detected by a receiver in the absence of the virtual pen image.
Figure 4:
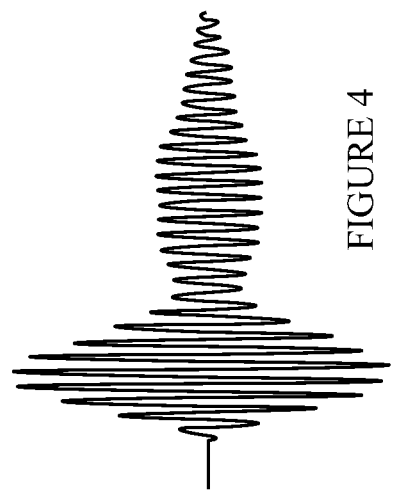
FIG. 4 is the signal obtained from the receiver for a particular point in the field of view of the receiver.

Refer now to FIGS. 3 and 4, which illustrate the detected acoustical waveform with and without interference, respectively. FIG. 3 illustrates the waveform that is detected by a receiver in the absence of the virtual pen image. However, when the virtual image generates a pulse that is nearly the same amplitude and out of phase by an odd multiple of a half wavelength, the signal shown in FIG. 4 is obtained. The interference varies depending on the particular point at which the pen is located in the field of view of the receiver. Since the delay between the virtual image pulse and the real pen image pulse depends on the location of the pen on the display surface, the electronics in the receiver that process the signals have problems for at least some of the locations on the display surface.

Figure 5:
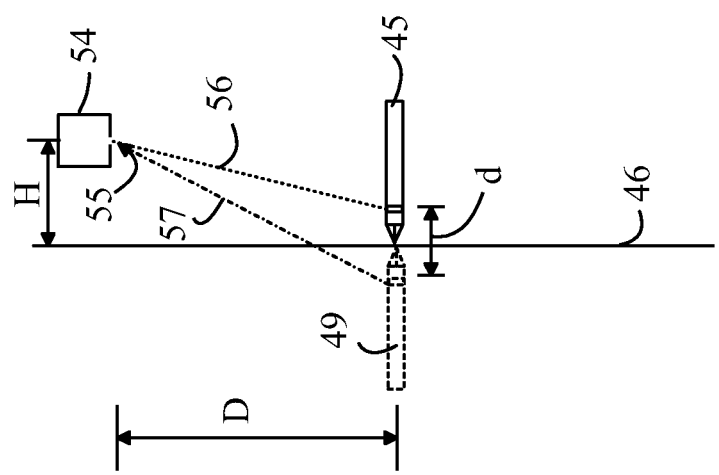
FIG. 5 is a cross-sectional view of a receiver and pen system when the pen is close to the acoustical receiver.

The present invention utilizes a receiver geometry that reduces the strength of the virtual signal and also averages the virtual signal in a manner that reduces the coherence between the virtual and real signals for locations that are close to the receiver. Refer now to FIG. 5, which is a cross-sectional view of a receiver and pen system when the pen is close to the acoustical receiver. In prior art systems, the acoustical receiver is typically a microphone that is enclosed in a housing 54 having an aperture 55 through which the acoustical energy is received. The diameter of aperture 55 is preferably less than the wavelength of the acoustical signal divided by 3.14. This arrangement improves the timing accuracy of the acoustical pulses and provides more uniform reception as pen 45 moves to different locations on display surface 46. When the receiver is offset from display surface 46 and the pen is close to the receiver, there are points in the field of view at which the distortions shown in FIG. 4 tend to be more significant because the difference in path length between paths 56 and 57 can assume values that are an odd multiple of a half wavelength.

The maximum difference between the path lengths occurs when the pen is directly under the receiver and is equal to d, where d is twice the distance between the transmitter on the pen and display surface 46. In many systems of interest, $d > \lambda/2$, where $\lambda$ is the wavelength of the acoustical signal generated by the pen. As D increases, the difference in path length decreases. When the pen is far from the receiver, the difference in path length decreases to a value that is significantly less than $\lambda/2$. Here "significantly less" is defined to be the point at which the constructive interference no longer presents a significant problem for the receiver. The distance from the receiver at which the difference in path length is always significantly less than $\lambda/2$ depends on H. This distance will be denoted by $D_{max}$ in the following discussion. Once, the pen is farther than from the receiver than $D_{max}$, the destructive interference no longer presents significant problems for the receiver, as the difference in path length will no longer be close to $n\lambda/2$, where n is an odd integer.

At distances between D=0 and $D=D_{max}$, there will be positions at which the difference is at or near $n\lambda/2$ and the destructive coherent interference causes significant problems. Hence, if the horn is designed such that the horn reduces the coherence between the signals from the virtual and real pens for distances that are less than $D_{max}$, the problems created by the destructive coherent interference between the signals are substantially reduced.

Figure 6:
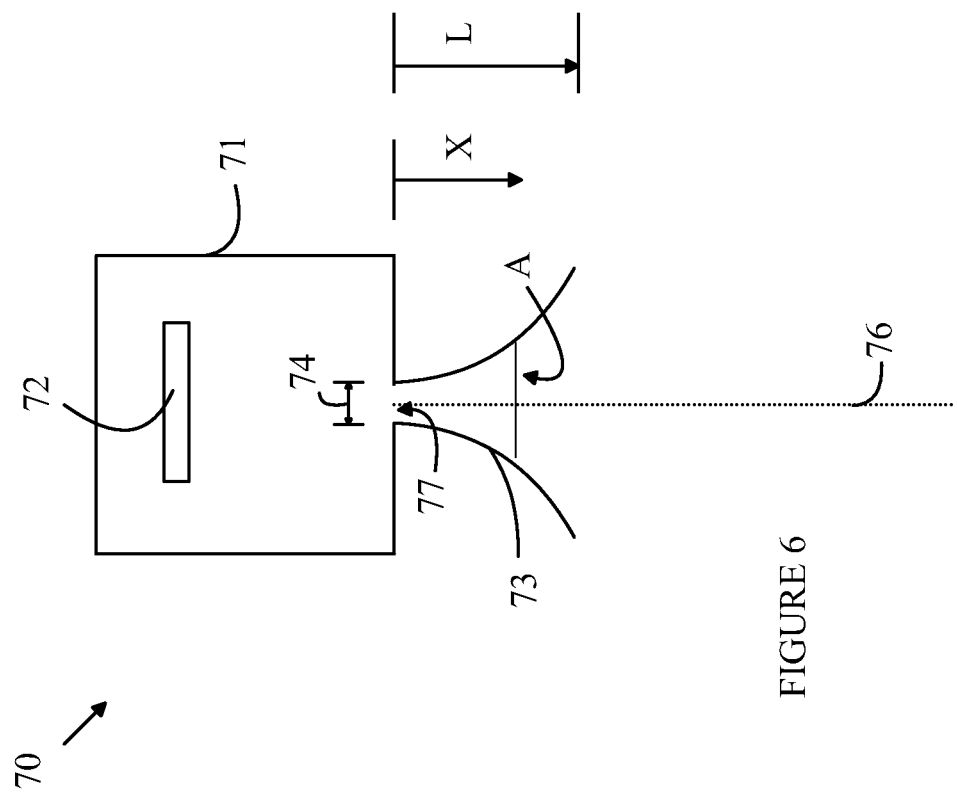
FIG. 6 is a cross-sectional view of an acoustical receiver according to one embodiment of the present invention.

The present invention utilizes a horn-shaped sound processing unit to reduce the coherence between the virtual and real signals for distances close to the receiver. Refer now to FIG. 6, which is a cross-sectional view of an acoustical receiver according to one embodiment of the present invention. Acoustical receiver 70 includes a housing 71 that contains a microphone 72. Housing 71 has an aperture 74 to which a horn-shaped sound-processing element is attached. The horn-shaped sound-processing element 73 is connected to the housing such that the throat of the horn 77 matches aperture 74.

The shape of the horn is preferably chosen to provide two functions. First, the shape is chosen to reduce the coherence of the signal from the virtual pen as described above. Second, the shape of the horn can be chosen to provide a cut-off frequency that reduces interference from acoustical sources having frequencies significantly below that of the transmitter in the pen. For the purposes of this discussion, the horn can be defined in terms of three parameters, the area of the horn at the throat of the horn that is adjacent to the aperture discussed above ($A_0$), depth of the horn (H), and relationship between the cross-sectional area of the horn, ($A(x)$), as a function of the distance (x) from the throat of the horn.

To simplify the following discussion, it will be assumed that the horn cross-section is circular. The diameter of the horn at its opening is a tradeoff between providing the desired reduction in the coherence discussed above and maintaining the desired properties needed for determining the pen position on the writing surface. Larger horn openings provide better reductions in coherence. However, large horn diameters result in two problems. First, large horn diameters lower the timing resolution of the acoustical sensing system, and hence, reduce the accuracy with which the pen can be located on the writing surface. Second, large horn diameters introduce directional variations into the acoustical receivers. Such directionality can lead to blind spots. As a result, embodiments in which the horn opening is between 1 and 10 times the wavelength of the acoustical signal are preferred. In one aspect of the invention, the horn opening is between 1 and 2 times the acoustical wavelength. In one specific example, the horn diameter is set to 1.75 times the acoustical wavelength.

The cutoff frequency of the exponential horn is given by $$f_c = mc/(4\pi)$$

where c is the speed of sound in air. Here, m is the horn flare constant given by $$m = (\ln(A_0/A(L))/L,$$

where L is the length of the horn. The cut-off frequency is also a tradeoff. The cutoff frequency is chosen to provide sufficient bandpass at the frequency of the acoustical signal while providing attenuation of unwanted background acoustical noise. The cutoff frequency provides a reduction in noise from low frequency noise sources. The noise reduction improves with increasing cutoff frequency. However, if the cutoff frequency is too near the acoustical frequency of interest, part of the desired signal is lost. If the cutoff frequency is set near the acoustical frequency, noise is reduced, but the desired signal is attenuated. In one exemplary embodiment, the cutoff frequency is chosen to be less than three quarters of the frequency of the acoustical signal generated by the pen and greater than 10 percent of the acoustical signal. In another exemplary embodiment, the cutoff frequency is chosen to be between 10 percent and half of the acoustical signal frequency, preferably at one quarter of the acoustical signal frequency.

In some cases, the acoustical sensor may have an unwanted resonant frequency. In such cases, the cutoff frequency can be adjusted to provide attenuation of the received signals at or near this unwanted resonant frequency. In one exemplary embodiment, the cutoff frequency is set to 10 kHz when the acoustical signal has a frequency of 40 kHz.

In one exemplary embodiment, the horn has a circular cross-section and the length of the horn is set to be about one half of the diameter of the mouth of the horn. In this example, the mouth of the horn has a diameter of 15 mm, a depth of 10 mm, and a throat diameter of 2 mm, with an exponentially increasing area. That is, $$A(x) = A_0 * e^{kx}$$

where k is a constant that is greater than 1. A horn that satisfies this relationship will be referred to as an exponential horn in the following discussion.

Sound waves that strike the horn at an angle with respect to normal 76 to the housing opening are averaged such that the sound is the superposition of a number of sinusoids that are slightly displaced with respect to one another. The degree of averaging depends on the angle incidence of the sound waves with respect to normal 76. An acoustical signal that is received along normal 76 undergoes the minimum amount of averaging. Hence, the horn arrangement effectively reduces the coherence of the signal from the virtual image and the pen image if the horn is positioned such that the signal from the virtual image arrives at an angle with respect to normal 76 that is greater than the angle at which the signal from the pen arrives.

Figure 7:
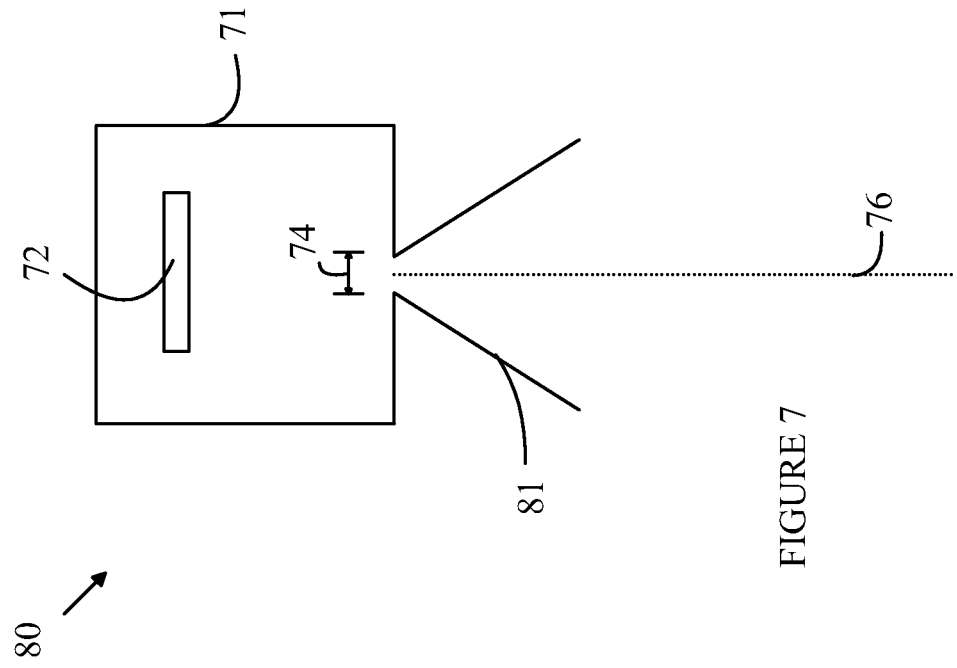
FIG. 7 illustrates another embodiment of an acoustical receiver according to the present invention.

As noted above, in one aspect of the invention, the shape of the horn is chosen such that the cross section area changes of the horn increases exponentially with distance from the throat of the horn. However, other shapes could be utilized. Refer now to FIG. 7, which illustrates another embodiment of an acoustical receiver according to the present invention. Acoustical receiver 80 utilizes a conical horn 81 with straight walls rather than exponential walls.

The discrimination between the virtual pen and the actual pen can be improved further by adjusting the angle of the acoustical receiver horn relative to the working surface. Refer now to FIG. 8, which illustrates the orientation of one of the acoustical receivers relative to the pen. The angle of the axis of the horn on acoustical receiver 90 relative to display surface 46 is adjusted such that the horn provides adequate discrimination against the virtual pen when pen 45 is at its closest point relative to acoustical receiver 90. The orientation should also be adjusted such that the tracking system is not significantly impaired by the horns on the acoustical receivers when the pen is farthest from the acoustical receivers. In one embodiment the axis of the horn in acoustical receiver 90 is pointed at the real pen when the real pen is the furthest point from acoustical receiver 90 to enhance the reception to real pen signal over the virtual pen signal.

A tracking system according to the present invention also provides improvements in embodiments that utilize backlit displays such as LCD displays. Temperature differences between the writing surface and the ambient air can lead to distortions of the acoustical signal. Such distortions cause problems in backlit displays since the surface temperature of the display can be tens of degrees warmer than the surrounding air. The layer of warm air over the display leads to a refraction of the acoustical signal in which the signal path is bent away from the display surface. As a result, a significant fraction of the acoustical energy is directed to points on the periphery of the display that are above the writing surface. If the acoustical receivers are placed on the periphery of the display at a location that is near the surface of the display, a significant fraction of the acoustical energy is lost leading to poor spatial resolution. Hence, it is advantageous to provide an acoustical sensor mount that is displaced from the writing surface by some distance in a direction that is perpendicular to the writing surface so that the receivers are better positioned to receive the refracted signal.

Refer again to FIG. 8. In embodiments in which display surface 46 is heated, the acoustical receiver 90 is mounted on an arm 91 that extends a distance $Z_0$ from the plane of display surface 46. The optimum distance will depend on the size of the display and the temperature differential between the display surface and the ambient temperature that can be determined experimentally.

The above-described embodiments may be viewed as two-dimensional tracking systems in that the goal of the pen tracking system is to determine the position of the pen on the writing surface. However, embodiments in which the position of the pen in three dimensions can also be implemented. Changes in the position of the pen over the writing surface can be utilized to communicate commands to the computer that controls the display. For example, moving the pen toward the writing surface could be utilized to implement a "zoom in" command that magnifies a portion of the scene.

Figure 9:
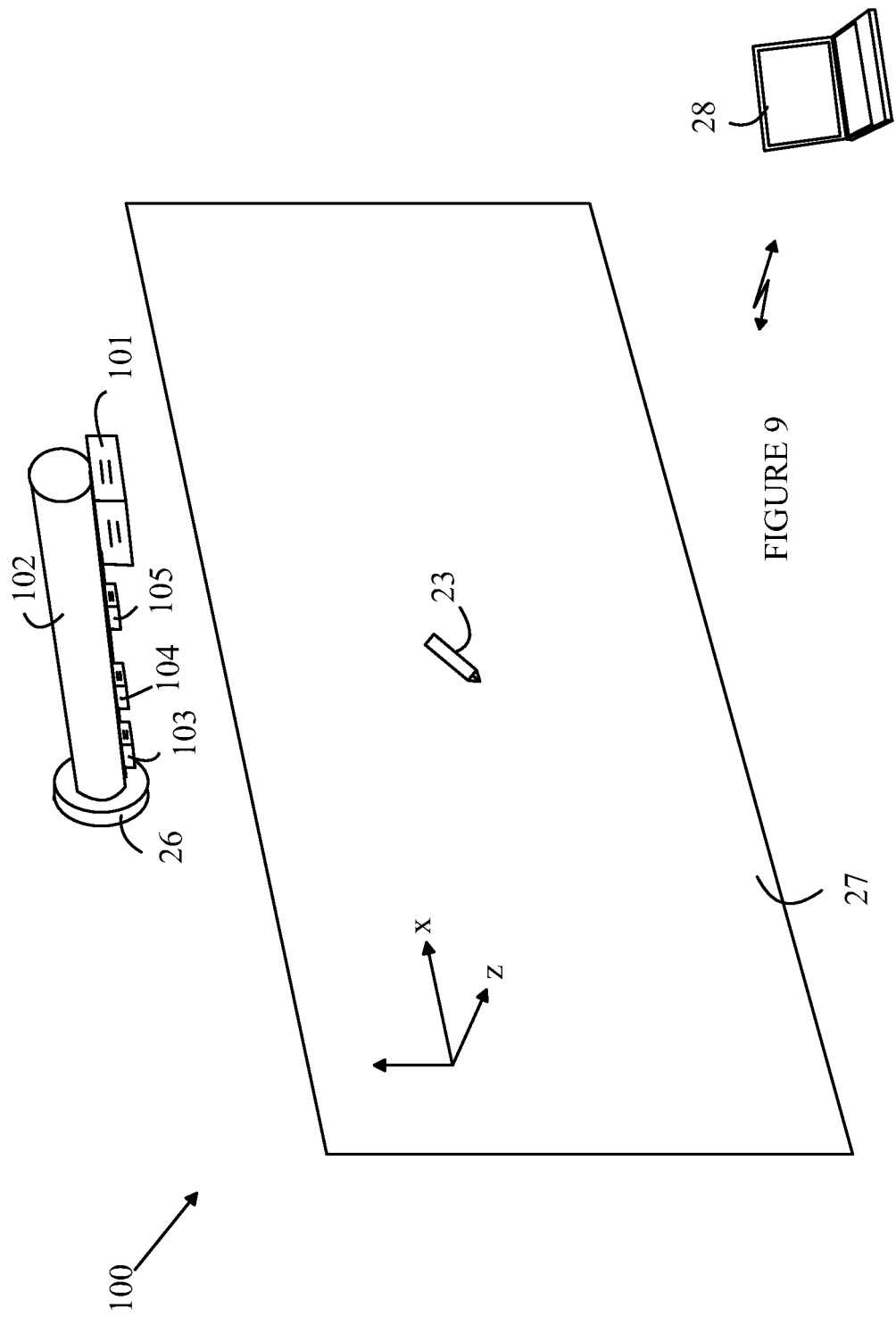
FIG. 9 illustrates another embodiment of an interactive display system according to the present invention

To simplify the following discussion, the pen position will be specified in a coordinate system in which the plane of the writing surface has coordinates (x,y,0). The distance of the pen over the writing surface will be denoted by z. That is, the position of the pen at any point in the field of view of the acoustical receivers will be denoted by (x,y,z). To determine the position of the pen in three dimensions, the acoustical tracking system requires at least three acoustical receivers that are separated from one another such that all three acoustical receivers do not lie on the same line. Refer now to FIG. 9, which illustrates another embodiment of an interactive display system according to the present invention. Display system 100 includes a projector 101 that projects an image that is generated by computer 28 on display surface 27. Projector 101 is mounted on an arm 102 that extends outward from display surface 27. Acoustical sensors 103-105 are mounted on arm 102. Each of the acoustical sensors includes an acoustical receiver with a horn as described above. In this embodiment, acoustical sensors 103 and 104 are displaced from one another along a line in the x-direction and have different x coordinates. Acoustical sensors 103 and 104 have the same z-coordinates in this example. Acoustical sensor 105 is mounted on arm 102 at a location that has a different z-location than that of acoustical sensors 103 and 104.

The above-described embodiments of the present invention utilize an infrared pulse to determine the difference in time of arrival between the acoustical pulses. However, any electromagnetic (EM) pulsed transmission could be utilized.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An acoustical receiver for detecting an acoustical signal characterized by a wavelength and a frequency, said receiver comprising:
a detector that generates an electrical signal in response to acoustical signals in a predetermined frequency range including said frequency;
a housing surrounding a microphone, said housing having an aperture with a diameter less than said wavelength divided by 3.14; and
a receiving horn characterized by first and second apertures, a depth, and a cutoff frequency, said first aperture being adjacent to said housing and having an opening with a maximum dimension less than said wavelength divided by 3.14, said second aperture having a maximum dimension that is greater than said wavelength, and said depth being chosen such that said cut-off frequency of said receiving horn is less than half of the frequency of said acoustical signal.

2. The acoustical receiver of claim 1 wherein said receiving horn comprises an exponential horn.

3. The acoustical receiver of claim 1 wherein said receiving horn comprises a conical horn.

4. The acoustical receiver of claim 3 wherein said receiving horn comprises an oblate spheroid.

5. An apparatus comprising:
a base;
first and second acoustical sensors that detect an acoustical signal emitted by a moveable signal source, said acoustical signal being characterized by a wavelength, said first and second acoustical sensors being mounted on said base and separated from one another;
an EM detector that detects an EM signal that is synchronized with said acoustical signal; and
a controller that measures a difference in a time of detection between said EM signal and said acoustical signal being detected by said first and second sensors;
wherein said first and second acoustical sensors each comprise:
a detector that generates an electrical signal in response to an acoustical signal in a predetermined frequency range; and
a housing surrounding said detector, said housing having a housing aperture having a maximum dimension that is less than the wavelength of said acoustical signal divided by 3.14;
a receiving horn having a first opening that is adjacent to said housing aperture and a second aperture having a dimension that is greater than said wavelength.

6. The apparatus of claim 5 further comprising a third acoustical sensor that detects said acoustical signal emitted by said moveable signal source, said third acoustical sensor being separated from said first and second acoustical sensors and being mounted such that said first and second and third acoustical sensors do not lie on the same line.

7. The apparatus of claim 6, wherein said controller determines a position of said moveable signal source in three dimensions relative to a predetermined coordinate system.

8. The apparatus of claim 5 wherein said receiving horn comprises a conical horn.

9. The apparatus of claim 8 wherein said receiving horn comprises an exponential horn.

10. The apparatus of claim 5 wherein said first opening has a maximum dimension that is less than said wavelength divided by 3.14.

11. The apparatus of claim 8 wherein said receiving horn comprises an oblate spheroid.

12. The apparatus of claim 5 wherein said acoustical sensors are part of a projector system that displays an image on a display surface.

13. The apparatus of claim 12 wherein said projector system comprises a backlit display.

14. The apparatus of claim 12 wherein said projector system includes a mounting element that attaches to a wall and an arm that positions a projector relative to said wall, and wherein said base is attached to said arm.

15. The apparatus of claim 14 wherein said base is part of said mounting element.

16. The apparatus of claim 5 wherein said base is attached to said projector.

* * * * *